(12) United States Patent
Yokoyama et al.

(10) Patent No.: US 8,318,337 B2
(45) Date of Patent: Nov. 27, 2012

(54) BATTERY INCLUDING ELECTRODE LEAD HAVING HIGH RESISTANT PORTION

(75) Inventors: Tomohiko Yokoyama, Osaka (JP); Masato Fujikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 572 days.

(21) Appl. No.: 12/498,729

(22) Filed: Jul. 7, 2009

(65) Prior Publication Data
US 2010/0028762 A1 Feb. 4, 2010

(30) Foreign Application Priority Data
Jul. 30, 2008 (JP) .................................. 2008-196336

(51) Int. Cl.
*H01M 2/22* (2006.01)
*H01M 2/26* (2006.01)
(52) U.S. Cl. ........................... 429/161; 429/94; 429/211
(58) Field of Classification Search ........................ None
See application file for complete search history.

(56) References Cited

FOREIGN PATENT DOCUMENTS
| JP | 09-330697 | * 12/1997 |
| JP | 10-214614 | 8/1998 |
| JP | 2006-100214 | * 4/2006 |

* cited by examiner

*Primary Examiner* — Jonathan Crepeau
(74) *Attorney, Agent, or Firm* — McDermott Will & Emery LLP (57) ABSTRACT

A battery includes an electrode assembly including a first electrode and a second electrode, a non-aqueous electrolyte, a battery case, a first lead connecting the first electrode with a bottom of the battery case, a seal member sealing an opening of the battery case, and a second lead connecting the second electrode with the seal member. At least one of the first lead and the second lead has a high resistant portion that has a higher resistance than the other portions per unit length. The high resistant portion is disposed at a position of the first lead closer to the first electrode than the portion connected to the bottom of the battery case or at a position of the second lead closer to the second electrode than the portion connected to the seal member. The high resistant portion is in contact with the battery case or the seal member.

12 Claims, 5 Drawing Sheets

BATTERY INCLUDING ELECTRODE LEAD HAVING HIGH RESISTANT PORTION

FIELD OF THE INVENTION

The invention relates to a battery including an electrode lead that connects the battery case or seal member with an electrode.

BACKGROUND OF THE INVENTION

A common battery includes: an electrode assembly comprising a positive electrode, a negative electrode, and a separator disposed between the two electrodes; a battery case housing the electrode assembly; a seal member sealing the battery case; a negative electrode lead connecting the negative electrode with the bottom of the battery case; and a positive electrode lead connecting the positive electrode with the seal member. For example, a nickel lead is used as the negative electrode lead.

When such a battery short-circuits externally, the nickel negative electrode lead, which has the highest resistance, is prone to generate heat. Of the negative electrode lead, the bent portion (the border between the part facing the inner side face of the battery case and the part facing the inner bottom face of the battery case and the adjacent portion), in particular, has a higher resistance than the other portions and generates a large amount of heat, since the bent portion is stretched due to plastic deformation. Also, since this portion is not in contact with the battery case, the heat generated by the negative electrode lead is unlikely to be released to outside through the battery case, and the battery temperature rises significantly.

In order to suppress the generation of heat by external short circuits, for example, Japanese Laid-Open Patent Publication No. Hei 10-214614 proposes a battery which is different in structure from the above-described battery. The proposed battery includes an electrode assembly, a battery case housing the electrode assembly, positive and negative electrode terminals provided on the battery case, a negative electrode lead connecting the negative electrode of the electrode assembly with the negative electrode terminal, and a positive electrode lead connecting the positive electrode with the positive electrode terminal. In this battery, a part of the negative electrode lead is provided with a narrow portion, so that in the event of an external short circuit, the narrow portion of the negative electrode lead is melted and broken to interrupt the current.

However, when such proposal is applied to, for example, a cylindrical battery, even if the narrow portion of the negative electrode lead is broken due to melting, the broken portions may adhere to each other again, thereby allowing the current to flow again to produce heat. In this case, since the narrow portion is not in contact with the battery case, the heat generated by the negative electrode lead is unlikely to be released from the battery, and the battery temperature rises significantly.

BRIEF SUMMARY OF THE INVENTION

It is therefore an object of the invention to provide a highly safe battery in which in the event of an external short-circuit, a rise in battery temperature due to the heat generation of an electrode lead is suppressed.

The invention is directed to a battery including: an electrode assembly including a first electrode and a second electrode which are laminated or wound with a porous insulating layer interposed therebetween; a non-aqueous electrolyte; a battery case housing the electrode assembly and the non-aqueous electrolyte; a first lead connecting the first electrode with a bottom of the battery case; a seal member sealing an opening of the battery case; and a second lead connecting the second electrode with the seal member. At least one of the first lead and the second lead has a high resistant portion that has a higher resistance than the other portions per unit length in the longitudinal direction of the lead. The high resistant portion is disposed at a position of the first lead closer to the first electrode than the portion connected to the bottom of the battery case or at a position of the second lead closer to the second electrode than the portion connected to the seal member. The high resistant portion is in contact with the battery case or the seal member.

In a preferable mode of the invention, the first lead has a thin portion, and the thin portion is in contact with the bottom of the battery case and serves as the high resistant portion.

In another preferable mode of the invention, the thin portion is provided in at least a part of the first lead in the width direction thereof.

In another preferable mode of the invention, the thin portion is provided continuously from one end of the first lead to the other end in the width direction thereof.

In another preferable mode of the invention, the second lead has a thin portion, and the thin portion is in contact with the seal member and serves as the high resistant portion.

In another preferable mode of the invention, the thin portion is provided in at least a part of the second lead in the width direction thereof.

In another preferable mode of the invention, the thin portion is provided continuously from one end of the second lead to the other end in the width direction thereof.

In another preferable mode of the invention, the thin portion is formed by a bending process, a pressing process, a cutting process, or a stretching process.

In another preferable mode of the invention, the first lead has a through-hole or a cut-away portion, and an area of the first lead adjacent to the through-hole or cut-away portion is in contact with the bottom of the battery case and serves as the high resistant portion.

In another preferable mode of the invention, the first lead has a pair of cut-away portions on both sides in the width direction so that a narrow portion is formed between the pair of cut-away portions, and the narrow portion is in contact with the bottom of the battery case and serves as the high resistant portion.

In another preferable mode of the invention, the second lead has a through-hole or a cut-away portion, and an area of the second lead adjacent to the through-hole or cut-away portion is in contact with the seal member and serves as the high resistant portion.

In another preferable mode of the invention, the second lead has a pair of cut-away portions on both sides in the width direction so that a narrow portion is formed between the pair of cut-away portions, and the narrow portion is in contact with the seal member and serves as the high resistant portion.

According to the invention, in the event of an external short circuit, the heat generated by an electrode lead is efficiently released from the battery, and a rise in battery temperature due to the heat generation of the electrode lead is significantly suppressed.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The battery of the invention includes a first electrode lead connecting one of the positive and negative electrodes of the electrode assembly with the bottom of the battery case and a second electrode lead connecting the other electrode with the seal member sealing the battery case. At least one of the electrode leads has a high resistant portion that has a higher resistance than the other portions per unit length in the longitudinal direction of the lead. The high resistant portion is disposed at a position of the first lead closer to the first electrode than the portion connected to the bottom of the battery case or at a position of the second lead closer to the second electrode than the portion connected to the seal member. The high resistant portion is in contact with the battery case or the seal member.

In this configuration, in the event of an external short circuit, the high resistant portion of the electrode lead is more likely to generate heat than the other portions. Since the high resistant portion of the electrode lead is in contact with the battery case or seal member, the heat generated by the high resistant portion is efficiently released to outside from the battery case or seal member. As a result, an increase in battery temperature due to the heat generation of the electrode lead is effectively suppressed. In this configuration, when the first lead is the negative electrode lead connecting the negative electrode with the battery case, the second lead is the positive electrode lead connecting the positive electrode with the seal member. Also, when the second lead is the negative electrode lead connecting the negative electrode with the seal member, the first lead is the positive electrode lead connecting the positive electrode with the battery case.

The positive electrode lead or negative electrode lead extends from the lower or upper part of the electrode assembly. When the direction in which the electrode lead extends (upward or downward direction) is perpendicular to the face of the bottom of the battery case or the seal member to which the electrode lead is to be welded, the electrode lead is bent, and the tip of the electrode lead is brought into contact with the bottom of the battery case or the seal member and welded thereto. The electrode lead is provided with a high resistant portion at a position closer to the first electrode or second electrode than the portion welded to the bottom of the battery case or the seal member. The high resistant portion is brought into contact with the battery case or seal member. The high resistant portion should have a higher resistance per unit length in the longitudinal direction of the lead than at least the bent portion that stretches due to plastic deformation. The high resistant portion can be easily provided by forming an area that is smaller in a cross-section perpendicular to the longitudinal direction of the lead than the bent portion.

In a first preferable embodiment of the electrode lead, the part of the electrode lead facing the battery case or seal member has a thin portion, i.e., a portion thinner than the other portions, and the thin portion is in contact with the battery case or the seal member and serves as the high resistant portion. The thin portion is more likely to generate heat than the other portions. The heat generated by the thin portion is transferred to the battery case or seal member through the contact portion, and released from the battery case or seal member. Therefore, an increase in the temperature of the electrode assembly is significantly suppressed. The thin portion is formed, for example, by a bending process, a pressing process, a cutting process, or a stretching process.

In a second preferable embodiment of the electrode lead, the electrode lead has a cut-away portion or through-hole, so that the area of the cross-section perpendicular to the longitudinal direction of the lead is reduced. The area adjacent to the cut-away portion or through-hole is in contact with the battery case or seal member and serves as the high resistant portion. The high resistant portion is more likely to generate heat than the other portions. The heat generated by the high resistant portion is transferred to the battery case or seal member through the contact portion, and released from the battery case or seal member. Therefore, an increase in the temperature of the electrode assembly is significantly suppressed. In the second embodiment, it is preferable to form cut-away portions on both sides of the electrode lead in the width direction thereof, since handling is easy in battery production.

The negative electrode lead can be, for example, a nickel foil, a copper foil, a nickel-plated copper foil, or a clad plate of nickel and copper. The thickness of the negative electrode lead is, for example, 0.05 to 0.2 mm.

The positive electrode lead is, for example, an aluminum foil, an aluminum alloy foil, or a clad plate of aluminum and stainless steel. The thickness of the positive electrode lead is, for example, 0.05 to 0.2 mm.

Figure 1:
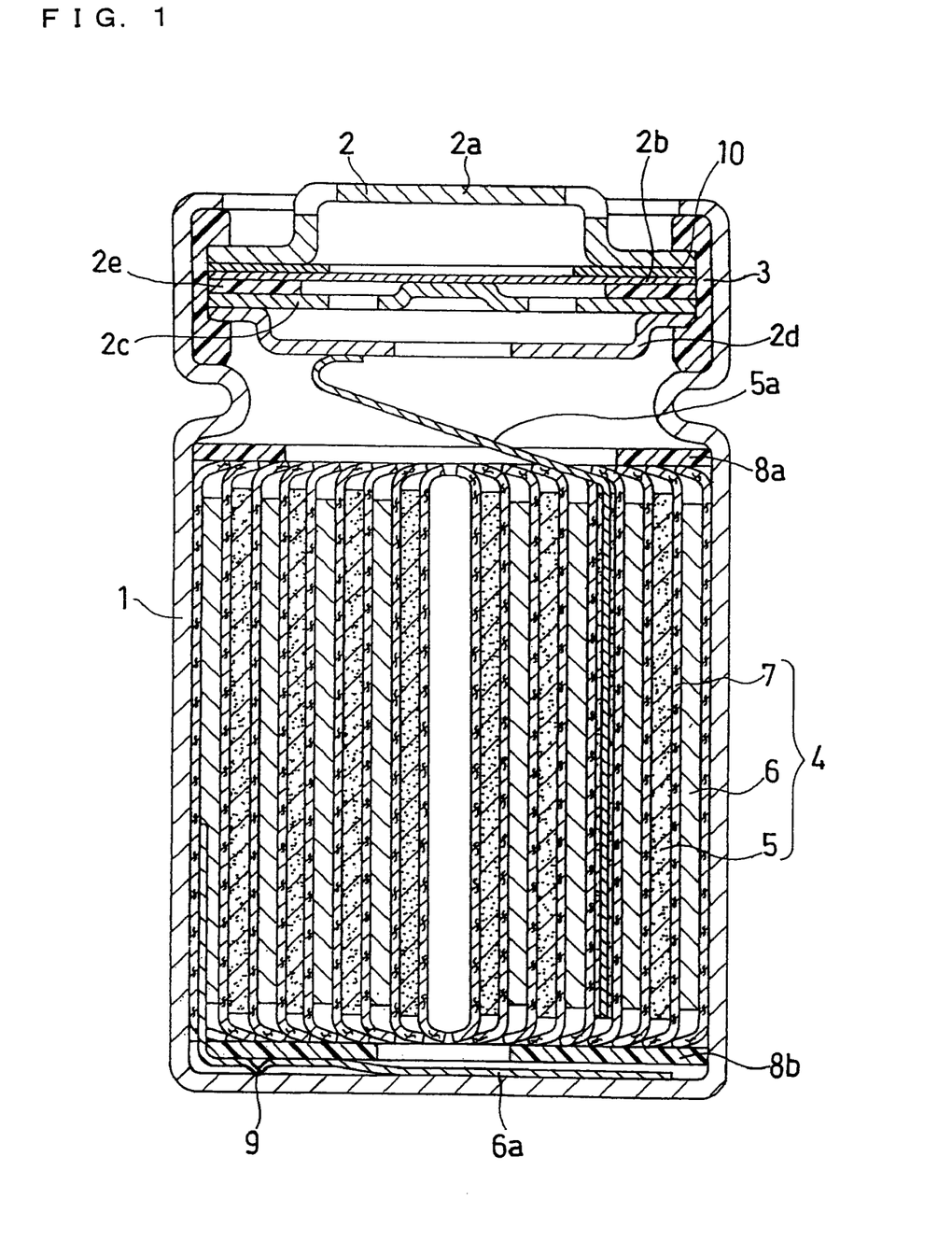
FIG. 1 is a schematic longitudinal sectional view of a cylindrical lithium ion secondary battery in an embodiment of the invention.

Referring now to drawings, a cylindrical lithium ion secondary battery is described as an embodiment of the battery of the invention. However, the invention is not to be construed as being limited to the following embodiment. FIG. 1 is a schematic longitudinal sectional view of a cylindrical lithium ion secondary battery in an embodiment of the battery of the invention.

As illustrated in FIG. 1, a cylindrical battery case 1 with a bottom contains an electrode assembly 4, which is formed by winding a strip-like positive electrode 5 and a strip-like negative electrode 6 with a strip-like separator 7 interposed therebetween. The positive electrode 5 comprises a positive electrode current collector and a positive electrode active material layer formed on the positive electrode current collector. The negative electrode 6 comprises a negative electrode current collector and a negative electrode active material layer formed on the negative electrode current collector. The electrode assembly 4 includes a non-aqueous electrolyte. The upper and lower parts of the electrode assembly 4 are fitted with a ring-like upper insulator plate 8a and a ring-like lower insulator plate 8b, respectively. The opening of the battery case 1 is crimped onto the circumference of a battery cover 2 with a gasket 3 interposed therebetween, to seal the battery case 1.

The battery cover 2 (seal member), which serves as the positive electrode terminal, includes: a seal plate 2a (positive electrode cap) having a protruded portion with air vents; an upper valve plate 2b and a lower valve plate 2c jointed at the center; a filter plate 2d; and a PTC device 10. An insulating member 2e is inserted between the upper valve plate 2b and the lower valve plate 2c.

When a large amount of gas is produced inside the battery due to battery overcharge or the like, and the internal pressure of the battery exceeds a predetermined value, the upper valve plate 2b breaks, thereby allowing the gas to be released from the battery through the air vents of the seal plate 2a. At the same time, the electrical connection between the upper valve plate 2b and the lower valve plate 2c is cut, so that the output current is interrupted.

The positive electrode 5 is electrically connected to the seal plate 2a through a positive electrode lead 5a. One end of the positive electrode lead 5a is connected to the central part of the positive electrode 5 where the current collector is exposed. The other end of the positive electrode lead 5a is connected to the lower side of the filter plate 2d of the battery cover 2. The negative electrode 6 is electrically connected to the battery case 1 through a negative electrode lead 6a. One end of the negative electrode lead 6a is connected to the outer edge of the negative electrode 6 where the current collector is exposed. The other end of the negative electrode lead 6a is connected to the inner bottom face of the battery case 1.

Figure 2:
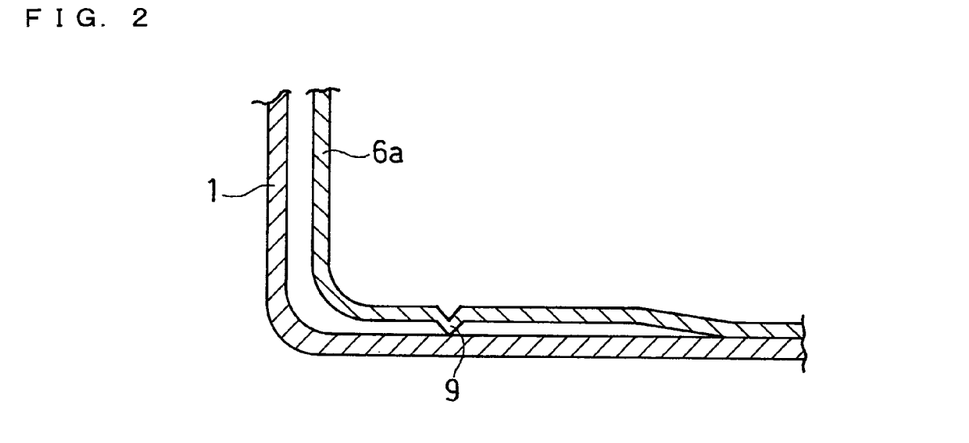
FIG. 2 is an enlarged longitudinal sectional view of the bottom of the battery illustrated in FIG. 1.
Figure 3:
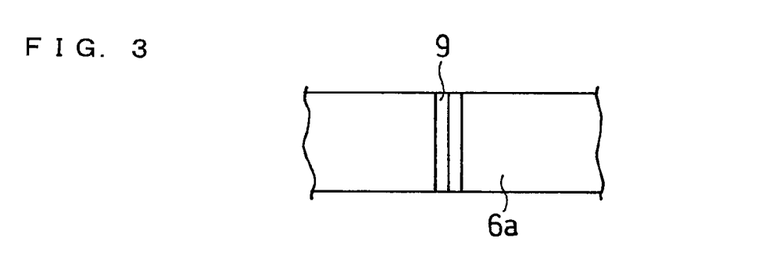
FIG. 3 is a plan view of the negative electrode lead illustrated in FIG. 2 having a high resistant portion which is formed by bending into a V shape.

FIG. 2 is an enlarged sectional view of the bottom of the battery case and the negative electrode lead with a thin portion 9 which are included in the battery illustrated in FIG. 1. FIG. 3 is a plan view of the negative electrode lead with the thin portion 9 illustrated in FIG. 2.

As illustrated in FIGS. 2 and 3, the negative electrode lead 6a has the thin portion 9 that is V-shaped in a cross-section in the direction perpendicular to the longitudinal direction thereof, i.e., the width direction thereof. The thin portion 9 is provided between the bent portion of the negative electrode lead 6a (i.e., the portion at the border between the part facing the inner side face of the battery case 1 and the part facing the inner bottom face of the battery case 1) and the portion of the negative electrode lead 6a welded to the inner bottom face of the battery case 1 (i.e., the tip of the lead). The thin portion 9 extends from one end of the negative electrode lead 6a to the other end in the width direction and protrudes in V-shape toward the inner bottom face of the battery case 1. Specifically, the thin portion 9 is formed by subjecting a part of the negative electrode lead 6a to a bending process such that the bent portion is thinner than the other portions.

The thin portion 9 is a high resistant portion in the negative electrode lead 6a. Thus, in the event of an external short circuit, heat is mainly generated in the thin portion 9. Since the thin portion 9 is in contact with the battery case 1, the heat is efficiently released to the outside of the battery from the thin portion 9 through the battery case 1. As a result, an increase in battery temperature due to the heat generation of the negative electrode lead 6a is significantly suppressed.

An example of such bending process is a process in which the negative electrode lead 6a is placed on a predetermined table, and a bending punch with a V-shaped edge is pressed against the negative electrode lead 6a. The portion of the negative electrode lead 6a subjected to the bending process is stretched, so that the thin portion 9 that is V-shaped in a cross-section is formed. It should be noted that when the electrode assembly 4 is placed in the battery case 1, the negative electrode lead 6a is pushed toward the inner bottom face of the battery case 1. Therefore, the V-shaped, protruding portion formed by the bending process easily comes into contact with the battery case 1 and this contact is maintained in a reliable manner. In addition to the V-shaped, protruding thin portion 9, the tip of the negative electrode lead 6a is also in contact with the inner bottom face of the battery case 1, and the other portions of the negative electrode lead 6a facing the inner bottom face of the battery case 1 are not in contact with the inner bottom face of the battery case 1.

Figure 4:
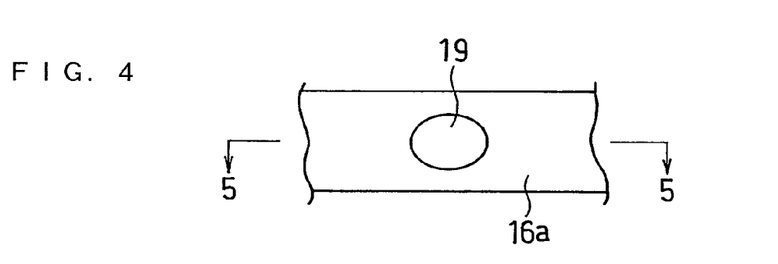
FIG. 4 is a plan view of a negative electrode lead with a high resistant portion which is formed by bending into an arc shape in another embodiment of the invention.
Figure 5:
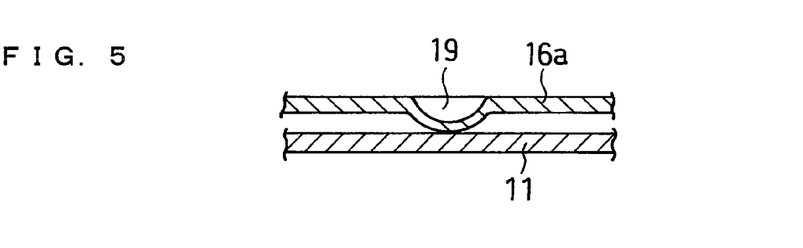
FIG. 5 is a sectional view taken along the line 5-5 in FIG. 4.

Instead of the negative electrode lead 6a having the thin portion 9 that is V-shaped in a cross-section, it is also possible to use a negative electrode lead 16a having a thin portion 19 that is arc-shaped in a cross-section perpendicular to the width direction, as illustrated in FIGS. 4 and 5. The thin portion 19 protrudes downward in the shape of a substantial hemisphere, and the top of the hemisphere is in contact with the inner bottom face of the battery case 11. The thin portion 19 is formed, for example, by placing the negative electrode lead 16a on a predetermined table and pressing a punch with a substantially hemispherical edge against a predetermined position of the negative electrode lead 16a.

Figure 6:
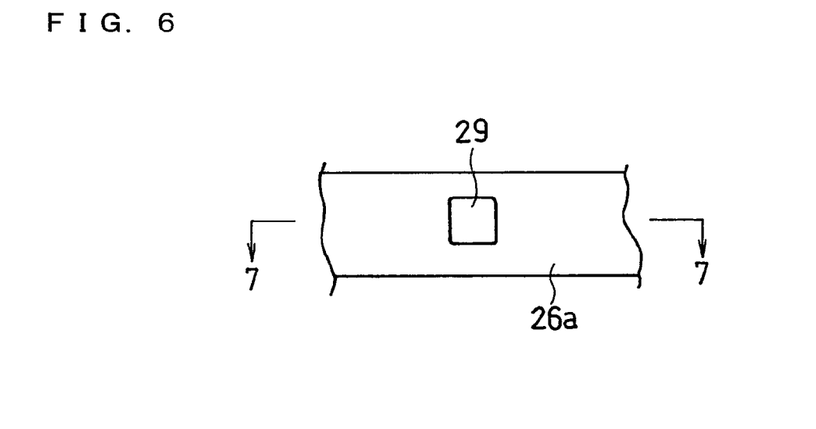
FIG. 6 is a plan view of a negative electrode lead with a high resistant portion which is formed by bending into a U shape in another embodiment of the invention.
Figure 7:
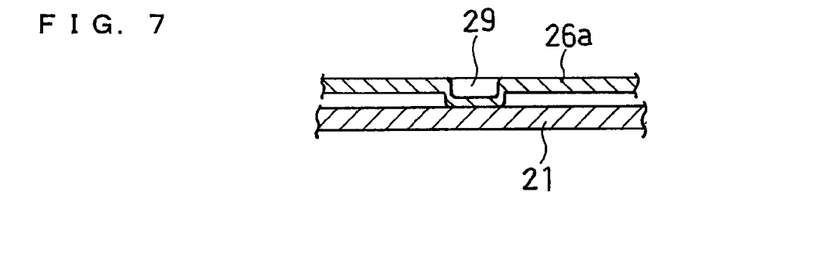
FIG. 7 is a sectional view taken along the line 7-7 in FIG. 6.

Instead of the negative electrode lead 16a having the hemispherical thin portion 19, it is also possible to use a negative electrode lead 26a having a thin portion 29 that is substantially U-shaped in a cross-section perpendicular to the width direction, as illustrated in FIGS. 6 and 7. The thin portion 29 protrudes downward in the shape of a substantial square. The thin portion 29 is formed, for example, by placing the negative electrode lead 26a on a predetermined table and pressing a punch with a square-prism-shaped edge against a predetermined position of the negative electrode lead 26a.

In order to ensure contact between the thin portion 9, 19, or 29 and the inner bottom face of the battery case 21 while minimizing the dead space in the height direction, it is preferable to set the difference in height between the major surface of the negative electrode lead facing the inner bottom face of the battery case and the top of the protruding part of the thin portion 9, 12, or 29 formed by the bending process to, for example, 0.05 mm to 0.2 mm.

Figure 8:
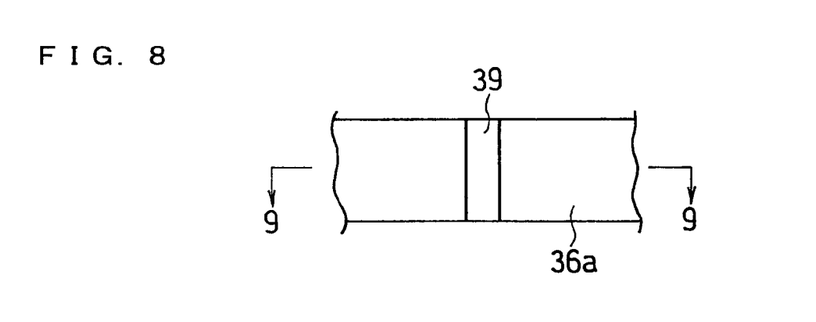
FIG. 8 is a plan view of a negative electrode lead with a high resistant portion which is formed along the width direction thereof in another embodiment of the invention.
Figure 9:
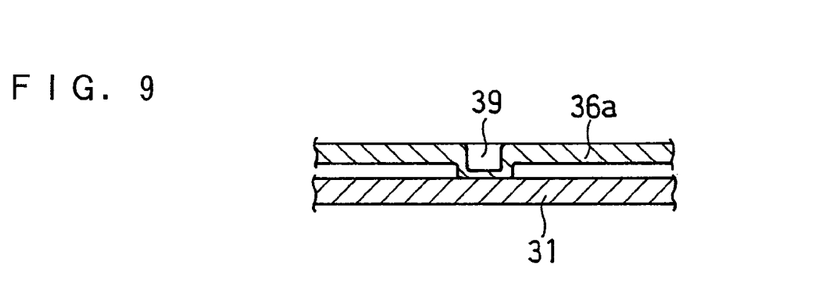
FIG. 9 is a sectional view taken along the line 9-9 in FIG. 8.

As illustrated in FIGS. 8 and 9, it is also possible to use a negative electrode lead 36a having a thin portion 39 that extends from one end to the other end in the width direction. The thin portion 39 is formed, for example, by a cutting process, a pressing process, or a stretching process.

The negative electrode leads 6a, 16a, 26a, and 36a are, for example, 0.05 mm to 0.2 mm in thickness and 2 mm to 5 mm in width. The thin portions 9, 19, 29, and 39 are, for example, 0.03 mm to 0.18 mm in thickness.

In the examples described above, a high resistant portion is formed by reducing the thickness and thus forming a thin portion. A high resistant portion can also be formed by making one or more cut-away portions or through-holes in the negative electrode lead along the thickness direction so that the area of the cross-section perpendicular to the longitudinal direction of the lead is smaller than those of the other portions.

Figure 10:
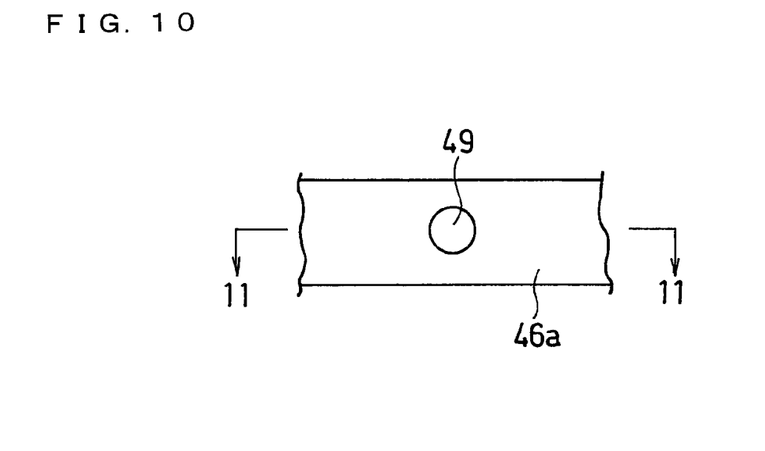
FIG. 10 is a plan view of a negative electrode lead with a high resistant portion which is formed by making a circular hole in another embodiment of the invention.
Figure 11:
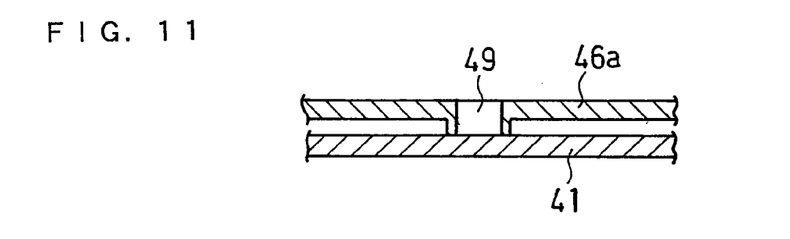
FIG. 11 is a sectional view taken along the line 11-11 in FIG. 10.
Figure 12:
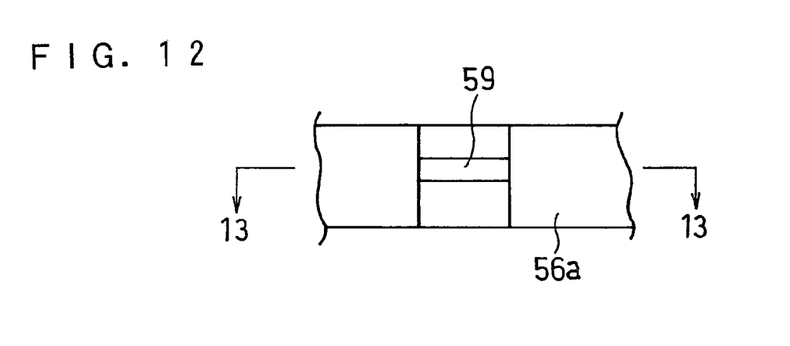
FIG. 12 is a plan view of a negative electrode lead with a high resistant portion which is formed by making a rectangular hole in another embodiment of the invention.
Figure 13:
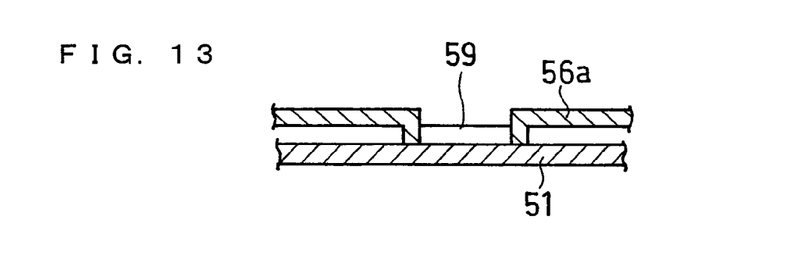
FIG. 13 is a sectional view taken along the line 13-13 in FIG. 12.

For example, as illustrated in FIGS. 10 and 11, it is also possible to use a negative electrode lead 46a having a circular through-hole 49 at the center in the width direction. As illustrated in FIGS. 12 and 13, it is also possible to use a negative electrode lead 56a having a rectangular through-hole 59 at the center in the width direction. In this case, the area adjacent to the through-hole 49 or 59 is brought into contact with the inner bottom face of a battery case 41 or 51. The negative electrode leads 46a and 56a are, for example, 0.05 mm to 0.2 mm in thickness and 2 mm to 5 mm in width. The circular through-hole 49 is, for example, 0.5 mm to 2 mm in diameter. One side of the rectangular through-hole 59 is, for example, 0.5 mm to 2 mm in length.

Figure 14:
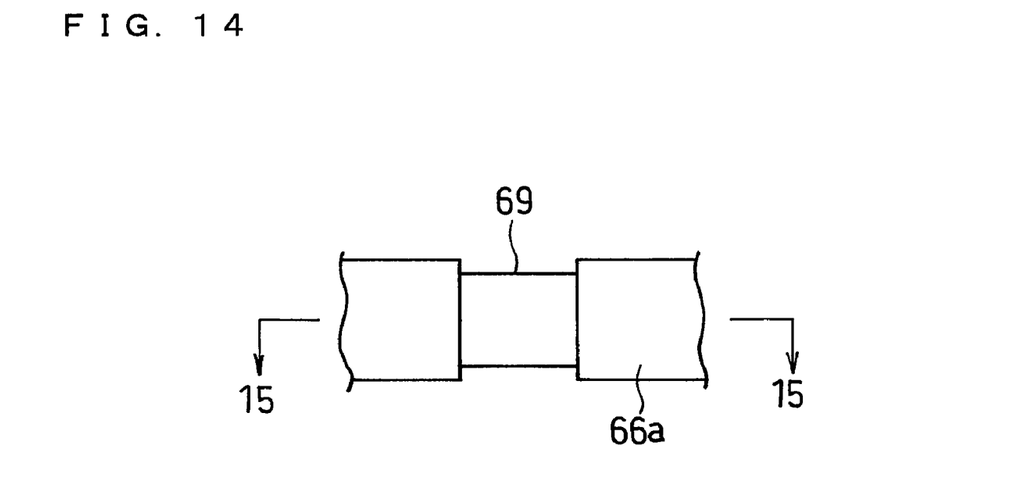
FIG. 14 is a plan view of a negative electrode lead with a high resistant portion which is formed by providing cut-away portions in another embodiment of the invention.
Figure 15:
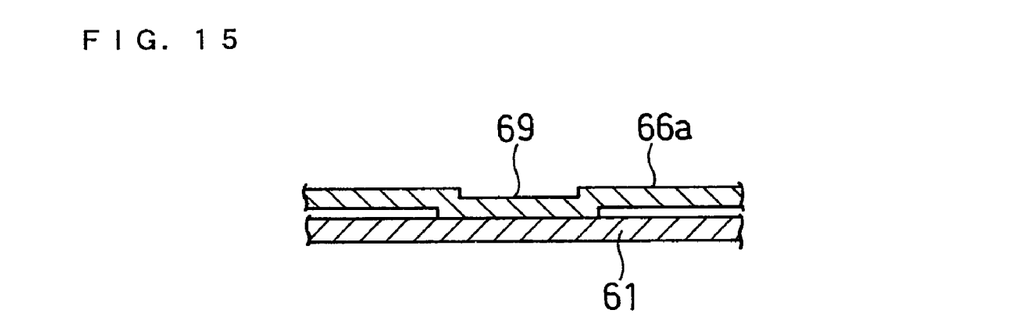
FIG. 15 is a sectional view taken along the line 15-15 in FIG. 14.

As illustrated in FIGS. 14 and 15, it is also possible to use a negative electrode lead 66a having a pair of rectangular cut-away portions 69 on both sides of the width thereof. The pair of cut-away portions 69 is disposed symmetrically with respect to a straight line that is parallel to the longitudinal direction of the negative electrode lead 66a passing through the midpoint in the width thereof. The narrow portion formed between the cut-away portions 69 is worked so that it contacts the inner bottom face of the battery case 61. The negative electrode lead 66a is, for example, 0.05 mm to 0.2 mm in thickness and 2 mm to 5 mm in width. The cut-away portions 69 are, for example, 0.025 mm to 1 mm in width and 1 mm to 5 mm in length.

The positive electrode active material layer includes, for example, a positive electrode active material, a conductive agent, and a binder. Examples of the positive electrode active material include lithium-containing composite oxides such as $LiCoO_2$, $LiNiO_2$, and $Li_2MnO_4$. They can be used singly or as a mixture of two or more of them. Examples of the conductive agent include graphites, such as natural graphite and artificial graphite, and carbon blacks, such as acetylene black, ketjen black, furnace black, lamp black, and thermal black. Examples of the binder include polyvinylidene fluoride, polytetrafluoroethylene, polyethylene, polypropylene, aramid resin, polyamide, and polyimide. The positive electrode current collector can be, for example, a metal foil such as aluminum foil, or a thin film of carbon or conductive resin.

The negative electrode active material layer includes, for example, a negative electrode active material, a conductive agent, and a binder. Also, the negative electrode active material layer can be, for example, a lithium metal plate or lithium alloy plate. Examples of the negative electrode active material include carbon materials, such as graphite, and materials capable of reversibly absorbing and desorbing lithium ions, such as silicon and tin. The conductive agent and binder for the negative electrode may be the same as those used as the conductive agent and binder for the positive electrode. The negative electrode current collector can be, for example, a metal foil, such as stainless steel foil, nickel foil, or copper foil, or a thin film of carbon or conductive resin.

The non-aqueous electrolyte is, for example, a liquid electrolyte comprising an organic solvent and a lithium salt dissolved in the organic solvent. Examples of the lithium salt are $LiPF_6$, $LiBF_4$, $LiClO_4$, $LiAlCl_4$, $LiSbF_6$, LiSCN, $LiCF_3SO_3$, $LiN(CF_3CO_2)$, and $LiN(CF_3SO_2)_2$. Examples of the organic solvent are ethylene carbonate, propylene carbonate, butylene carbonate, dimethyl carbonate, diethyl carbonate, and ethyl methyl carbonate.

The separator 7 can be made of, for example, polyethylene, polypropylene, a laminate of polyethylene and polypropylene, or a copolymer of ethylene and propylene. In this embodiment, the separator was used as the porous insulating layer. However, instead of the separator, it is also possible to use as the porous insulating layer a polymer electrolyte layer prepared by adding a polymeric material to a liquid non-aqueous electrolyte comprising an organic solvent and a lithium salt to make it unflowable.

The battery case 1 is composed of a metal material such as iron, nickel, or copper.

In the above embodiments, the negative electrode lead 6a was provided with a high resistant portion, but the positive electrode lead 5a may also be provided with a high resistant portion. More specifically, the positive electrode lead 5a may have a high resistant portion between the bent portion near the contact portion with the filter plate 2d and the portion welded to the filter plate 2d, and the high resistant portion may be brought into contact with the filter plate 2d.

Examples of the invention are hereinafter described in detail, but the invention is not to be construed as being limited to these Examples.

EXAMPLE 1

A cylindrical lithium ion secondary battery as illustrated in FIG. 1 was produced as follows.

(1) Preparation of Positive Electrode

A positive electrode mixture paste was prepared by mixing 100 parts by weight of lithium cobaltate ($LiCoO_2$) with a mean particle size of 10 μm, serving as a positive electrode active material, 8 parts by weight of polyvinylidene fluoride, serving as a binder, and 3 parts by weight of acetylene black, serving as a conductive agent, with a suitable amount of N-methyl-2-pyrrolidone. The positive electrode mixture paste was applied onto both sides of a strip-like positive electrode current collector comprising an aluminum foil (length 600 mm, width 54 mm, thickness 20 μm), except for an area where the positive electrode current collector has to be exposed to provide a connection with a positive electrode lead (exposed part of the positive electrode current collector). The positive electrode mixture paste was dried to obtain a laminate comprising the positive electrode current collector and the positive electrode active material layers formed on both sides of the positive electrode current collector. The laminate was rolled to make the thickness of each positive electrode active material layer 70 μm. In this way, a strip-like positive electrode 5 was produced. It should be noted that the exposed part of the positive electrode current collector was disposed near the center of the positive electrode 5. A strip-like aluminum positive electrode lead 5a (length 50 mm, width 3 mm, thickness 0.1 mm) was prepared. One end of the positive electrode lead 5a was connected to one side of the exposed part of the positive electrode current collector by ultrasonic welding. It should be noted that the positive electrode lead 5a is made of aluminum having low resistance, and that the amount of heat generated by the positive electrode lead 5a upon an external short circuit is small. Therefore, there was no need to provide the positive electrode lead 5a with a thin portion.

(2) Preparation of Negative Electrode

A negative electrode mixture paste was prepared by mixing 100 parts by weight of artificial graphite with a mean particle size of 20 μm, serving as a negative electrode active material, 1 part by weight of styrene butadiene rubber, serving as a binder, and 1 part by weight of carboxymethyl cellulose, serving as a thickener, with a suitable amount of water. The negative electrode mixture paste was applied onto both sides of a negative electrode current collector comprising a copper foil (length 630 mm, width 56 mm, thickness 10 µm), except for an area where the negative electrode current collector has to be exposed to provide a connection with a negative electrode lead (exposed part of the negative electrode current collector). The negative electrode mixture paste was dried to obtain a laminate comprising the negative electrode current collector and the negative electrode active material layers on both sides of the negative electrode current collector. The laminate was rolled to make the thickness of each negative electrode active material layer 65 µm. In this way, a strip-like negative electrode 6 was produced. The exposed part of the negative electrode current collector was disposed at the end of the negative electrode current collector on the final winding side. A strip-like nickel negative electrode lead 6a (length 50 mm, width 3 mm, thickness 0.1 mm) was prepared. The part of the negative electrode lead 6a to come into contact with the inner bottom face of the battery case 1 was subjected to a bending process to form a thin portion 9 that was V-shaped in a cross-section perpendicular to the width direction. The thickness of the thin portion 9 was 0.08 mm, and the height of the top of the V-shaped protruding part was 0.1 mm from the main face of the negative electrode lead 6a. One end of the negative electrode lead 6a was connected to one side of the exposed part of the negative electrode current collector by ultrasonic welding.

(3) Battery Fabrication

A 20 µm-thick polyethylene micro-porous film available from Asahi Kasei Corporation was used as a separator 7. The positive electrode 5 and the negative electrode 6 produced in the above manner were wound with the separator 7 interposed therebetween, to obtain an electrode assembly 4. At this time, the positive electrode 5 and the negative electrode 6 were disposed so that the end of the negative electrode 6 to which the negative electrode lead 6a was connected was positioned on the final winding side. Also, the positive electrode 5 and the negative electrode 6 were disposed so that the positive electrode lead 5a extended upward from the electrode assembly 4 while the negative electrode lead 6a extended downward from the electrode assembly 4.

The electrode assembly 4 was placed in a cylindrical iron battery case 1 with a bottom. The other end of the positive electrode lead 5a was connected to a filter plate 2d of a battery cover 2 by laser welding. The other end of the negative electrode lead 6a was connected to the inner bottom face of the battery case 1 by resistance welding. At this time, the negative electrode lead 6a was bent at the border between the part facing the inner side face of the battery case 1 and the part facing the inner bottom face of the battery case 1. Also, the thin portion (high resistant portion) 9 of the negative electrode lead 6a was brought into contact with the inner bottom face of the battery case 1, as illustrated in FIG. 2. In the example illustrated therein, since the thin portion 9 is under the load of the electrode assembly 4, the thin portion 9 is in sufficient contact with the battery case so that heat can be exchanged therebetween. The thickness of the bent portion of the negative electrode lead 6a was 0.09 mm, so the thin portion 9 was thinner than the bent portion.

The upper and lower parts of the electrode assembly 4 were fitted with an upper insulator plate 8a and a lower insulator plate 8b, respectively, each of which was made of polypropylene. A non-aqueous electrolyte was injected into the battery case 1. The non-aqueous electrolyte was prepared by dissolving $LiPF_6$ at a concentration of 1.0 mol/L in a solvent mixture containing ethylene carbonate and ethyl methyl carbonate in a volume ratio of 1:1.

A step was formed in the battery case 1 at the position 5 mm below the open edge thereof. The battery cover 2 was placed on the step of the battery case 1, with a ring-like gasket 3 interposed therebetween. The open edge of the battery case 1 was crimped onto the circumference of the battery cover 2 with the gasket 3 interposed therebetween, to seal the opening of the battery case 1. In this way, a cylindrical lithium ion secondary battery (diameter 18 mm, height 65 mm, design capacity 2600 mAh) was produced.

COMPARATIVE EXAMPLE 1

A battery was produced in the same manner as in Example 1, except that the part of the negative electrode lead to come into contact with the inner bottom face of the battery case was not subjected to a bending process (i.e., a high resistant portion was not formed).

(Evaluation)

An external short circuit test was conducted by the following method. Of each of Example 1 and Comparative Example 1, ten batteries were prepared. In a 25° C. environment, each of the batteries was charged at a constant current of 1500 mA until the battery voltage reached 4.25 V. The charged battery was allowed to stand in a 60° C. environment for 1 hour. Thereafter, in the 60° C. environment, the positive and negative electrodes of the charged battery were externally short-circuited, using a predetermined test circuit (resistance value: 0.005Ω). At this time, the number of batteries whose temperature exceeded 80° C. was counted. The temperature of a battery as used herein refers to the surface temperature of the battery, and is hereinafter referred to as "battery temperature". In the external short circuit test, a battery whose battery temperature was equal to or lower than 80° C. was determined to be a battery having good safety. The test results are shown in Table 1.

TABLE 1

| | Battery temperature Battery No. | | | | | | | | | |
|---|---|---|---|---|---|---|---|---|---|---|
| | 1 | 2 | 3 | 4 | 5 | 6 | 7 | 8 | 9 | 10 |
| Example 1 | 64° C. | 61° C. | 66° C. | 63° C. | 64° C. | 62° C. | 63° C. | 65° C. | 62° C. | 61° C. |
| Comparative Example 1 | 94° C. | 87° C. | 93° C. | 98° C. | 86° C. | 99° C. | 91° C. | 92° C. | 95° C. | 84° C. |

In Example 1, the battery temperatures of all the batteries were lower than 80° C. Contrary to this, in Comparative Example 1, the battery temperatures of all the batteries were higher than 80° C. The external short circuit test has thus confirmed that the batteries of Example 1 have good safety.

The batteries of the invention, which have good safety, are advantageously used as the power source for portable electronic devices, such as personal computers, cell phones, mobile devices, personal digital assistants (PDA), portable game machines, and video cameras. Also, they are advantageously used as the power source assisting electric motors for hybrid electric vehicles (HEVs) and fuel cell vehicles and as the power source for power tools, vacuum cleaners, robots, and plug-in HEVs.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A battery comprising:
    an electrode assembly comprising a first electrode and a second electrode which are laminated or wound with a porous insulating layer interposed therebetween;
    a non-aqueous electrolyte;
    a battery case housing the electrode assembly and the non-aqueous electrolyte;
    a first lead connecting the first electrode with a bottom of the battery case by welding;
    a seal member sealing an opening of the battery case; and
    a second lead connecting the second electrode with the seal member by welding,
    wherein at least one of the first lead and the second lead has a high resistant portion that has a higher resistance than the other portions per unit length in the longitudinal direction of the lead,
    the high resistant portion is disposed at a position of the first lead closer to the first electrode than the welded portion connected to the bottom of the battery case or at a position of the second lead closer to the second electrode than the welded portion connected to the seal member, and
    the high resistant portion is not welded but in contact with the battery case or the seal member.

2. The battery in accordance with claim 1, wherein the first lead has a thin portion, and the thin portion is in contact with the bottom of the battery case and serves as the high resistant portion.

3. The battery in accordance with claim 2, wherein the thin portion is provided in at least a part of the first lead in the width direction thereof.

4. The battery in accordance with claim 2, wherein the thin portion is provided continuously from one end of the first lead to the other end in the width direction thereof.

5. The battery in accordance with claim 1, wherein the second lead has a thin portion, and the thin portion is in contact with the seal member and serves as the high resistant portion.

6. The battery in accordance with claim 5, wherein the thin portion is provided in at least a part of the second lead in the width direction thereof.

7. The battery in accordance with claim 5, wherein the thin portion is provided continuously from one end of the second lead to the other end in the width direction thereof.

8. The battery in accordance with claim 2, wherein the thin portion is formed by a bending process, a pressing process, a cutting process, or a stretching process.

9. The battery in accordance with claim 1, wherein the first lead has a through-hole or a cut-away portion, and
    an area of the first lead adjacent to the through-hole or cut-away portion is in contact with the bottom of the battery case and serves as the high resistant portion.

10. The battery in accordance with claim 1, wherein the first lead has a pair of cut-away portions on both sides in the width direction so that a narrow portion is formed between the pair of cut-away portions, and
    the narrow portion is in contact with the bottom of the battery case and serves as the high resistant portion.

11. The battery in accordance with claim 1, wherein the second lead has a through-hole or a cut-away portion, and
    an area of the second lead adjacent to the through-hole or cut-away portion is in contact with the seal member and serves as the high resistant portion.

12. The battery in accordance with claim 1, wherein the second lead has a pair of cut-away portions on both sides in the width direction so that a narrow portion is formed between the pair of cut-away portions, and
    the narrow portion is in contact with the seal member and serves as the high resistant portion.

* * * * *